United States Patent
Wang et al.

(10) Patent No.: US 11,074,679 B2
(45) Date of Patent: Jul. 27, 2021

(54) IMAGE CORRECTION AND DISPLAY METHOD AND DEVICE

(71) Applicant: Huawei Technologies Co., Ltd., Shenzhen (CN)

(72) Inventors: Yahui Wang, Beijing (CN); Xin Chen, Shenzhen (CN); Yunchao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 16/483,950

(22) PCT Filed: Feb. 6, 2017

(86) PCT No.: PCT/CN2017/072949
§ 371 (c)(1),
(2) Date: Aug. 6, 2019

(87) PCT Pub. No.: WO2018/141109
PCT Pub. Date: Aug. 9, 2018

(65) Prior Publication Data
US 2020/0051226 A1    Feb. 13, 2020

(51) Int. Cl.
*G06T 5/50* (2006.01)
*G06T 7/50* (2017.01)
(Continued)

(52) U.S. Cl.
CPC .............. *G06T 5/50* (2013.01); *G06T 7/13* (2017.01); *G06T 7/50* (2017.01); *H04N 5/23222* (2013.01); *G06T 2207/30176* (2013.01)

(58) Field of Classification Search
CPC . G06T 5/50; G06T 2207/30176; G06T 5/005; H04N 1/3876
See application file for complete search history.

(56) References Cited

U.S. PATENT DOCUMENTS

2008/0226171 A1   9/2008   Yin et al.
2011/0234912 A1   9/2011   Wang et al.
(Continued)

FOREIGN PATENT DOCUMENTS

CN    101267493 A    9/2008
CN    101312540 A    11/2008
(Continued)

OTHER PUBLICATIONS

Machine Translation and Abstract of Chinese Publication No. CN102510506, Jun. 20, 2012, 17 pages.
(Continued)

*Primary Examiner* — Christopher K Peterson
(74) *Attorney, Agent, or Firm* — Conley Rose, P.C.

(57) ABSTRACT

A method includes photographing a first image, where the first image comprises a document. A first area of the document is obscured by a first obstruction. The method further includes determining a location of the first area based on depth data. The method further includes photographing a second image. The method further includes restoring the obstructed information in the first area based on the second image. The method further includes displaying a third image, wherein the third image comprises the document and the first obstruction s removed from the first area of the document.

20 Claims, 11 Drawing Sheets

(51) Int. Cl.
*G06T 7/13* (2017.01)
*H04N 5/232* (2006.01)
*H04N 1/387* (2006.01)
*G06T 7/543* (2017.01)
*G06T 5/00* (2006.01)
*G06K 9/72* (2006.01)
*G06K 9/00* (2006.01)
*G06T 3/60* (2006.01)

(56) References Cited

U.S. PATENT DOCUMENTS

| | | | |
|---|---|---|---|
| 2013/0259385 A1 | 10/2013 | Xie et al. | |
| 2014/0368891 A1* | 12/2014 | Beato | G06K 9/32 358/474 |
| 2015/0187101 A1* | 7/2015 | Maayan | G06F 3/017 345/654 |
| 2016/0232405 A1* | 8/2016 | Iwayama | G06K 9/2081 |
| 2017/0154433 A1* | 6/2017 | Takakura | G06T 7/55 |

FOREIGN PATENT DOCUMENTS

| | | |
|---|---|---|
| CN | 102510506 A | 6/2012 |
| CN | 103366165 A | 10/2013 |
| CN | 103310218 B | 8/2016 |
| CN | 106327445 A | 1/2017 |
| CN | 104657993 B | 4/2018 |
| JP | 2007194873 A | 8/2007 |
| JP | 2010276642 A | 12/2010 |

OTHER PUBLICATIONS

Machine Translation and Abstract of Chinese Publication No. CN2007194873, Aug. 2, 2007, 36 pages.
Machine Translation and Abstract of Japanese Publication No. JP2010276642, Dec. 9, 2010, 30 pages.
Foreign Communication From a Counterpart Application, PCT Application No. PCT/CN2017/072949, English Translation of International Search Report dated Oct. 27, 2017, 2 pages.
Foreign Communication From a Counterpart Application, PCT Application No. PCT/CN2017/072949, English Translation of Written Opinion dated Oct. 27, 2017, 4 pages.
Machine Translation and Abstract of Chinese Publication No. CN101312540, Nov. 26, 2008, 19 pages.
Machine Translation and Abstract of Chinese Publication No. CN103310218, Aug. 10, 2016, 8 pages.
Machine Translation and Abstract of Chinese Publication No. CN104657993, Apr. 17, 2018, 13 pages.
Machine Translation and Abstract of Chinese Publication No. CN106327445, Jan. 11, 2017, 16 pages.
Machine Translation and Abstract of Japanese Publication No. JP2007194873, Aug. 2, 2007, 36 pages.

* cited by examiner

200

- 201 — Photograph a first image, where the first image includes a quadrilateral, and there are a plurality of sampling points in an area of the quadrilateral
- 202 — Establish a reference plane, where the reference plane is a plane on which the quadrilateral is located, and the plurality of sampling points have corresponding projected points on the reference plane
- 203 — Calculate a difference between first depth data and second depth data, where the first depth data is a distance between each of the plurality of sampling points and a plane on which a camera is located, and the second depth data is a distance between the projected point corresponding to each sampling point and the plane on which the camera is located
- 204 — Determine, based on the difference, whether an obstruction exists in the area of the quadrilateral
- 205 — When the obstruction exists in the area of the quadrilateral, obtain a first sampling point whose difference is greater than a first threshold in the area of the quadrilateral
- 206 — Determine a first obstruction area based on a location of the first sampling point
- 207 — Restore obstructed information in the first obstruction area

FIG. 3

IMAGE CORRECTION AND DISPLAY METHOD AND DEVICE

CROSS-REFERENCE TO RELATED APPLICATIONS

This application is a national stage application of International Application No. PCT/CN2017/072949, filed on Feb. 6, 2017, which is hereby incorporated by reference in its entirety.

TECHNICAL FIELD

This application relates to the communications field, and more specifically, to an image processing method and device.

BACKGROUND

As technologies advance, photographing becomes an indispensable information obtaining manner in people's daily life. In addition, a user has a higher requirement for a photographing effect, and therefore image processing becomes a common means. For example, when a PPT and a poster being played in a conference are photographed, because a photographer is at a non-ideal location or angle, and does not directly face a screen, the PPT photographed in a normal mode is skew, and may not be clearly seen at a remote end. In this case, currently an image is mainly processed through document correction, to correct a document to a regular rectangle. However, it is found in actual use that, when a PPT is played in a conference scenario, a body or an arm of a spokesperson obstructs the PPT, or a head of an audience in a front row enters a photographing range. Consequently, when document correction is performed, an obstruction still exists, and therefore a corrected document is neither complete nor beautiful.

To overcome impact of an obstruction on photographing when document information, such as the PPT and the poster, is photographed, how to improve an image processing capability is an urgent problem to be resolved.

SUMMARY

Embodiments of this application provide an image processing method and device, so as to determine whether an obstruction exists in a photographed image by using depth data, and when it is determined that the obstruction exists, remove the obstruction and restore obstructed information.

According to a first aspect, an embodiment of this application provides an image processing method, including: photographing a first image, where the first image includes a quadrilateral, and there are a plurality of sampling points in an area of the quadrilateral; establishing a reference plane, where the reference plane is a plane on which the quadrilateral is located, and the plurality of sampling points have corresponding projected points on the reference plane; calculating a difference between first depth data and second depth data, where the first depth data is a distance between each of the plurality of sampling points and a plane on which a camera is located, and the second depth data is a distance between the projected point corresponding to each sampling point and the plane on which the camera is located; and determining, based on the difference, whether an obstruction exists in the area of the quadrilateral.

Therefore, in this embodiment of this application, when an image is photographed, a reference plane is established based on the photographed image, and whether an obstruction exists on the photographed image may be determined based on a difference between depth data of the photographed image and depth data of the reference plane, so as to determine whether an obstruction exists within a range of the photographed image.

Optionally, in an implementation of the first aspect, before the establishing a reference plane, the method further includes: performing edge detection on the first image to determine at least four edge line segments; obtaining depth data of each edge line segment of the at least four edge line segments; and selecting, based on the depth data of each edge line segment, four edge line segments on a same plane to form the quadrilateral.

Optionally, in an implementation of the first aspect, after the establishing a reference plane, edge detection is performed on the quadrilateral on the reference plane based on the first depth data to obtain a more accurate area of the quadrilateral.

Optionally, in an implementation of the first aspect, the determining, based on the difference, whether an obstruction exists in the area of the quadrilateral includes: if a percentage of sampling points whose difference is greater than a first threshold in a total quantity of the plurality of sampling points is greater than a second threshold, determining that the obstruction exists in the area of the quadrilateral; or if a percentage of sampling points whose difference is greater than a first threshold in a total quantity of the plurality of sampling points is less than or equal to a second threshold, or if the difference of each sampling point is less than or equal to the first threshold, determining that no obstruction exists in the area of the quadrilateral.

Optionally, in an implementation of the first aspect, the establishing a reference plane includes: establishing a spatial coordinate system by using the plane on which the camera used for photographing the first image is located as an xy plane, a distance from the camera to the quadrilateral as a z-axis, and a point on the plane on which the camera is located as an origin; and establishing the reference plane based on the spatial coordinate system by using a spatial plane equation Ax+By+Cz+D=0, where x, y, and z are three variables in the spatial coordinate system, and A, B, C, and D are constants.

Optionally, in an implementation of the first aspect, the establishing the reference plane based on the spatial coordinate system by using a spatial plane equation Ax+By+Cz+D=0 includes: obtaining spatial coordinates of the quadrilateral; selecting the spatial coordinates of the quadrilateral at least twice, where three points in the spatial coordinates of the quadrilateral are selected each time of the at least twice; solving for the coefficients A, B, C, and D of the plane equation by using the three points that are in the spatial coordinates of the quadrilateral and that are selected each time of the at least twice; and comparing coefficients A, B, C, and D of the plane equation that are solved for each time of the at least twice, where if an error of the coefficients A, B, C, and D of the plane equation that are solved for each time of the at least twice is less than a third threshold, a plane equation determined based on the coefficients A, B, C, and D whose error is less than the third threshold is the plane equation of the reference plane.

Optionally, in an implementation of the first aspect, the method further includes: when the obstruction exists in the area of the quadrilateral, obtaining a first sampling point whose difference is greater than the first threshold in the area of the quadrilateral; determining a first obstruction area based on a location of the first sampling point; and restoring obstructed information in the first obstruction area.

Therefore, in this embodiment of this application, when it is determined that an obstruction exists in an area of a photographed image, an obstruction area is determined by using depth data of the photographed image and depth data of a reference plane, and obstructed information is restored.

Optionally, in an implementation of the first aspect, the restoring obstructed information in the first obstruction area includes: photographing a second image, where the second image includes partial or all obstructed information in the first obstruction area; and restoring the obstructed information in the first obstruction area based on the partial or all obstructed information.

Optionally; in an implementation of the first aspect, a first feature point of the first image is extracted, and a first feature descriptor is calculated; a second feature point of the second image is extracted, and a second feature descriptor is calculated; a transformation matrix between the first image and the second image is calculated based on the first feature descriptor and the second feature descriptor; and a second obstruction area in the second image is calculated based on the transformation matrix.

Optionally, in an implementation of the first aspect, the second obstruction area includes the partial or all obstructed information in the first obstruction area.

Optionally, in an implementation of the first aspect, when the second image includes all the obstructed information in the first obstruction area, an interpolation operation is performed on the first obstruction area by using a grayscale value of a pixel in the second image and the transformation matrix, to restore the obstructed information in the first obstruction area.

Optionally, in an implementation of the first aspect, when the second image includes the partial obstructed information in the first obstruction area, it is determined that a first intersection area exists between the first obstruction area and the second obstruction area; a third obstruction area is calculated, where the third obstruction area is another obstruction area other than the first intersection area in the second obstruction area; a fourth obstruction area in the first image that is corresponding to the third obstruction area is calculated based on the transformation matrix; and an interpolation operation is performed on the fourth obstruction area by using the grayscale value of the pixel in the second image and the transformation matrix, to restore obstructed information in the fourth obstruction area.

Optionally, in an implementation of the first aspect, whether the obstructed information in the first obstruction area is totally restored is determined; and when the obstructed information in the first obstruction area is totally restored, a program is exited; or when the obstructed information in the first obstruction area is partially restored, and there is no new image, indication information used to indicate a failure in removing the fifth obstruction area is generated; or when the obstructed information in the first obstruction area is partially restored, and there is a new image, a third image is photographed.

Optionally; in an implementation of the first aspect, the restoring obstructed information in the first obstruction area further includes: photographing a third image, where the third image includes partial obstructed information in the first obstruction area; and restoring the obstructed information in the first obstruction area based on the partial obstructed information that is in the first obstruction area and that is included in the second image and the partial obstructed information that is in the first obstruction area and that is included in the third image.

Optionally; in an implementation of the first aspect, the method further includes: generating first prompt information, where the first prompt information is used to prompt a location of the obstruction.

Optionally, in an implementation of the first aspect, the method further includes: generating second prompt information, where the second prompt information is used to instruct a user to move the camera.

Optionally, in an implementation of the first aspect, the method further includes: after restoring obstructed information in the first obstruction area, performing document correction on the quadrilateral.

Optionally; in an implementation of the first aspect, the method further includes: when no obstruction exists in the area of the quadrilateral, performing document correction on the quadrilateral.

Optionally, in an implementation of the first aspect, the first image is an image including document information.

According to a second aspect, an embodiment of this application provides an image processing device, configured to perform the method according to any one of the first aspect or the possible implementations of the first aspect. Specifically, the device includes a module or a unit configured to perform the method according to any one of the first aspect or the possible implementations of the first aspect.

According to a third aspect, an embodiment of this application provides an image processing device, configured to perform the method according to any one of the first aspect or the possible implementations of the first aspect, where the image processing device includes a processor, a memory, and a camera. The memory is configured to store an instruction, the camera is configured to photograph an image, and the processor is configured to execute the instruction stored in the memory.

The camera is configured to photograph a first image, where the first image includes a quadrilateral, and there are a plurality of sampling points in an area of the quadrilateral:

the processor is configured to establish a reference plane, where the reference plane is a plane on which the quadrilateral is located, and the plurality of sampling points have corresponding projected points on the reference plane;

the processor is configured to calculate a difference between first depth data and second depth data, where the first depth data is a distance between each of the plurality of sampling points and a plane on which the camera is located, and the second depth data is a distance between the projected point corresponding to each sampling point and the plane on which the camera is located;

the processor is configured to determine, based on the difference, whether an obstruction exists in the area of the quadrilateral;

the processor is further configured to: when determining that the obstruction exists in the area of the quadrilateral, restore obstructed information in the area of the quadrilateral; and the processor is further configured to perform document correction on the restored obstructed information.

According to a fourth aspect, an embodiment of this application provides a terminal device, and the terminal device includes the image processing device according to the second aspect, a display panel, a read-only memory, a random access memory, a register, and at least one button.

According to a fifth aspect, an embodiment of this application provides a computer program product that includes an instruction. When the instruction is run on a computer, the computer performs the method in the possible implementations of the foregoing aspects.

According to a sixth aspect, an embodiment of this application provides a computer readable storage medium, and the computer readable storage medium stores an instruction. When the instruction is run on a computer, the computer performs the method in the possible implementations of the foregoing aspects.

BRIEF DESCRIPTION OF DRAWINGS

FIG. 3 is a schematic flowchart of an image processing method according to another embodiment of this application:

DESCRIPTION OF EMBODIMENTS

The following describes technical solutions of embodiments in this application with reference to accompanying drawings.

It should be understood that, in the embodiments of this application, an image processing device may be a camera, or may be a terminal having a photographing function, for example, user equipment (User Equipment, "UE" for short), an access terminal, a subscriber unit, a mobile device, a user terminal, an aerial photography device, a drone device, a monitoring device, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a calculation device, another processing device connected to a wireless modem, an in-vehicle device, a wearable device, a terminal device in a future fifth generation (5th-Generation. "5G" for short) network, a terminal device in a future evolved public land mobile network (Public Land Mobile Network, "PLMN" for short), or the like.

Figure 1:
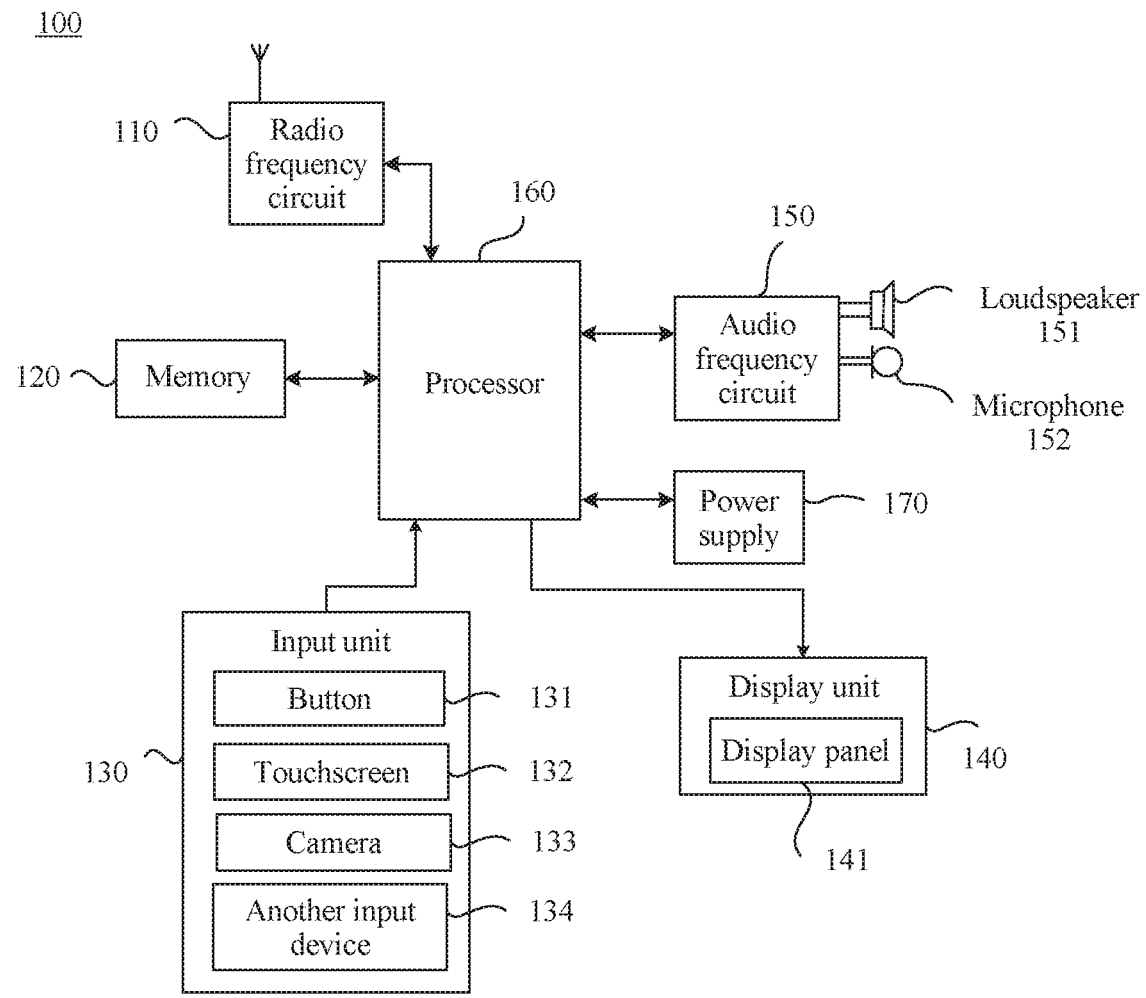
FIG. 1 is a schematic structural diagram of a mobile phone that can be applied to an embodiment of this application.

Optionally, that the image processing device is a mobile phone is used as an example. FIG. 1 is a schematic structural diagram of a mobile phone 100 that can be applied to an embodiment of this application.

As shown in FIG. 1, the mobile phone 100 includes components such as a radio frequency (Radio Frequency, "RF" for short) circuit 110, a memory 120, an input unit 130, a display unit 140, an audio frequency circuit 150, a processor 160, and a power supply 170. A person skilled in the art may understand that a structure of the mobile phone 100 shown in FIG. 1 does not constitute a limitation on the mobile phone, and the mobile phone may include more or fewer components than those shown in the figure, or combine some components, or have a different component arrangement.

The following describes all constituent components of the terminal device 100 in detail with reference to FIG. 1.

The RF circuit 110 may be configured to: send and receive signals in an information sending or receiving process or a call process; particularly, after receiving downlink information of a base station, send the downlink information to the processor 160 for processing; and send uplink data to the base station. Generally, the RF circuit includes but is not limited to an antenna, at least one amplifier, a transceiver, a coupler, a low noise amplifier (Low Noise Amplifier, "LNA" for short), a duplexer, and the like. In addition, the RF circuit 110 may further communicate with a network and another device through wireless communication. Any communications standard or protocol may be used for the wireless communication, including but not limited to Global System for Mobile Communications (Global System for Mobile Communication, "GSM" for short), general packet radio service (General Packet Radio Service, "GPRS" for short), Wideband Code Division Multiple Access (Code Division Multiple Access, Code Division Multiple Access), WCDMA (Wideband Code Division Multiple Access, "CDMA" for short), Long Term Evolution (Long Term Evolution, "LTE" for short), email, short message service (Short Messaging Service, "SMS" for short), and the like.

The memory 120 may be configured to store a software program and a module. The processor 160 executes various function applications and data processing of the mobile phone 100 by running the software program and the module stored in the memory 120. The memory 160 may mainly include a program storage area and a data storage area. The program storage area may store an operating system, an application program required by at least one function (such as a sound playing function, an image playing function, a photographing function, a document correction function, or an obstruction detection and removal function), and the like. The data storage area may store data (such as audio data, image data, or a phone book) created based on use of the mobile phone 100, and the like. In addition, the memory 120 may include a high-speed random access memory, or may include a non-volatile memory, such as at least one magnetic disk storage device, a flash memory device, or another volatile solid-state storage device.

The input unit 130 may be configured to: receive input digit or character information; and generate key signal input related to user setting and function control of the mobile phone 100. Specifically, the input unit 130 may include a button 131, a touchscreen 132, a camera 133, and another input device 134. The button 131 may sense a pressing operation performed by a user on the button 131, and drive a corresponding connection apparatus according to a preset program. Optionally, the button includes a power button, a volume control button, a home button, a shortcut button, and the like. The touchscreen 132, also referred to as a touch panel, may collect a touch operation performed by the user on or near the touchscreen, such as an operation performed by the user on the touchscreen 132 or near the touchscreen 132 by using any proper object or accessory, such as a finger or a stylus, and drive a corresponding connection apparatus according to a preset program. Optionally, the touchscreen 132 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information to touch point coordinates, and sends the touch point coordinates to the processor 160, and can receive and execute a command sent by the processor 160. In addition, the touchscreen 132 may be implemented by using a plurality of types such as a resistive type, a capacitive type, an infrared ray, and a surface acoustic wave. Optionally, the camera 133 may collect depth data of a target image, for example, dual cameras. The input unit 130 may include the another input device 134 in addition to the button 131, the touchscreen 132, and the camera 133. Specifically, the another input device 134 may include but is not limited to one or more of a physical keyboard, a trackball, a mouse, and a joystick.

The display unit 140 may be configured to display information input by the user or information provided for the user and various menus of the mobile phone 100. The display unit 140 may include a display panel 141. Optionally, the display panel 141 may be configured in a form such as a liquid crystal display (Liquid Crystal Display, "LCD" for short) or an organic light-emitting diode (Organic Light-Emitting Diode, "OLED" for short). When detecting a pressing operation, the button 131 may transmit the pressing operation to the processor 160, to determine a type of a pressing event, and then the processor 160 provides corresponding visual output on the display panel 141 based on the type of the pressing event. Further, the touchscreen 132 may cover the display panel 141. When detecting a touch operation on or near the touchscreen 132, the touchscreen 132 transmits the touch operation to the processor 160, to determine a type of a touch event, and then the processor 160 provides corresponding visual output on the display panel 141 based on the type of the touch event. In FIG. 1, the touchscreen 132 and the display panel 141 are used as two independent parts to implement input and input functions of the mobile phone 100. However, in some embodiments, the touchscreen 132 and the display panel 141 may be integrated to implement the input and output functions of the mobile phone 100.

The audio frequency circuit 150, a loudspeaker 151, and a microphone 152 may provide audio interfaces between the user and the mobile phone 100. The audio frequency circuit 150 may transmit, to the loudspeaker 151, a received electrical signal obtained after audio data conversion, and the loudspeaker 151 converts the electrical signal to a sound signal for output. In addition, the microphone 152 converts a collected sound signal to an electrical signal, and the audio frequency circuit 150 receives the electrical signal, converts the electrical signal to audio data, and outputs the audio data to the RF circuit 110, to send the audio data to, for example, another terminal device, or outputs the audio data to the memory 120 for further processing.

The processor 160 is a control center of the mobile phone 100, uses various interfaces and lines to connect all parts of the entire terminal device, and performs various functions and data processing of the mobile phone 100 by running or executing the software program and/or the module stored in the memory 120 and invoking data stored in the memory 120, so as to perform overall monitoring on the mobile phone 100. Optionally, the processor 160 may include one or more processing units. Preferably, an application processor and a modem processor may be integrated into the processor 160. The application processor mainly processes an operating system, a user interface, an application program, and the like. The modem processor mainly processes wireless communication. It may be understood that the modem processor may not be integrated into the processor 160.

The mobile phone 100 further includes the power supply 170 (such as a battery) that supplies power to each component. Preferably, the power supply may be logically connected to the processor 160 by using a power management system, so as to implement functions such as charging and discharging management and power consumption management by using the power management system.

Although not shown, the mobile phone 100 may further include a Wireless Fidelity (Wireless Fidelity, "Wi-Fi" for short) module, a Bluetooth module, and the like, and an optical sensor, a gyroscope, a barometer, a hygrometer, a thermometer, an infrared sensor, and the like may be further disposed on the mobile phone 100. Details are not described herein.

Figure 2:
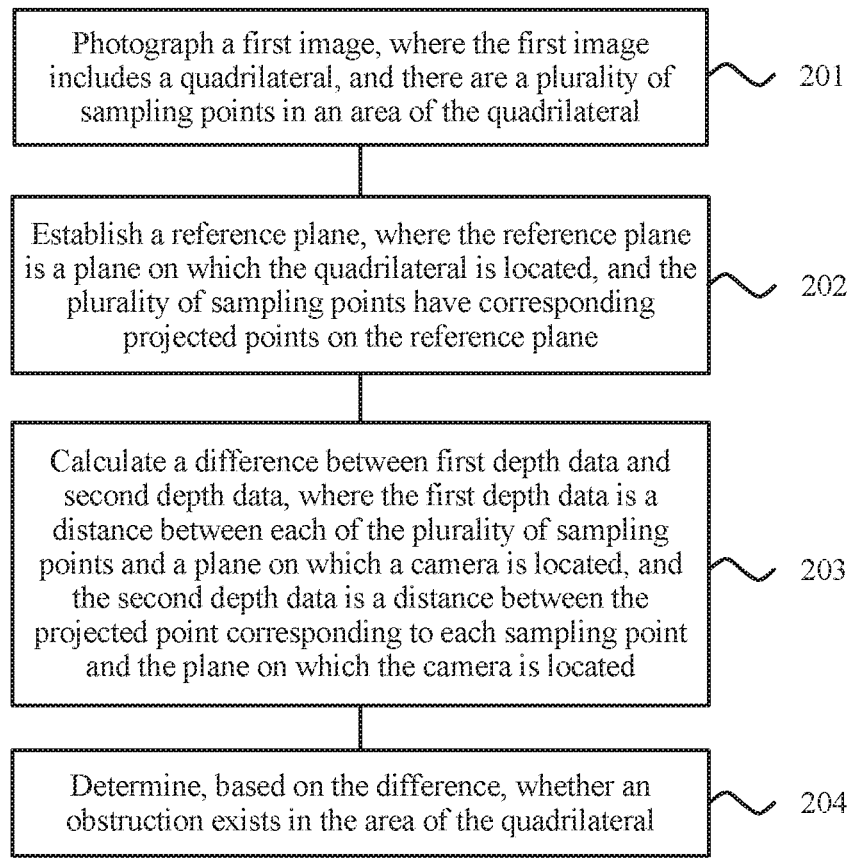
FIG. 2 is a schematic flowchart of an image processing method according to an embodiment of this application.

FIG. 2 is a schematic flowchart of an image processing method 200 according to an embodiment of this application. The method 200 may be performed by some terminals having a photographing function, for example, the mobile phone 100 shown in FIG. 1. Certainly, the method 200 may be performed by another terminal. This is not specifically limited in this embodiment of this application.

201. Photograph a first image, where the first image includes a quadrilateral, and there are a plurality of sampling points in an area of the quadrilateral.

Optionally, the quadrilateral may be a square, may be a rectangle, or may be an irregular quadrilateral. Four sides of the quadrilateral may be straight lines, or may be curve lines approximating to a straight line.

Optionally, the area of the quadrilateral may include document information, such as a PPT, a poster, a signpost, or a license plate.

Optionally, before the first image is photographed, whether the quadrilateral exists in the first image is first determined. When it is determined that the quadrilateral exists, the first image is photographed.

Optionally, the quadrilateral may be determined through edge detection.

Specifically, the edge detection is performed on the first image to determine at least four edge line segments, depth data of each edge line segment of the at least four edge line segments is obtained, and four edge line segments on a same plane are selected, based on the depth data of each edge line segment, to form the quadrilateral.

202. Establish a reference plane, where the reference plane is a plane on which the quadrilateral is located, and the plurality of sampling points have corresponding projected points on the reference plane.

Optionally, the reference plane may be established based on the quadrilateral.

Optionally, a plane equation of the reference plane may be determined in a multi-iteration manner.

Specifically, three points of the plurality of sampling points in the area of the quadrilateral are selected, and the reference plane is established according to a spatial plane equation $Ax+By+Cz+D=0$, where x, y, and z are three variables in a spatial coordinate system, and A, B, C, and D are constants. The plurality of sampling points in the area of the quadrilateral are located in one spatial coordinate system, and the spatial coordinate system is established as follows: A plane on which a camera capturing the first image is located is used as an xy plane, a distance from the camera to the quadrilateral is used as a z-axis, and a point on the plane on which the camera is located is used as an origin.

For example, spatial coordinates of the quadrilateral are obtained. The spatial coordinates of the quadrilateral are selected at least twice, and three points in the spatial coordinates of the quadrilateral are selected each time of the at least twice. The coefficients A, B, C, and D of the plane equation are solved for by using the three points that are in the spatial coordinates of the quadrilateral and that are selected each time of the at least twice. Coefficients A, B, C, and D of the plane equation that are solved for each time of the at least twice are compared. If an error of the coefficients A, B, C, and D of the plane equation that are solved for each time of the at least twice is less than a third threshold, a plane equation determined based on the coefficients A, B, C, and D whose error is less than the third threshold is the plane equation of the reference plane.

For example, three points a, b, and c in the area of the quadrilateral are selected for a first time, and coordinates of the three points are specifically a $(x_1, y_1, z_1)$, b $(x_2, y_2, z_2)$, and c $(x_3, y_3, z_3)$. The three points a, b, and c are substituted into the spatial plane equation $Ax+By+Cz+D=0$, and $A_1$, $B_1$, $C_1$, and $D_1$ are obtained through calculation. Three points d, e, and f in the area of the quadrilateral are selected for a second time, and coordinates of the three points are specifically d $(x_4, y_4, z_4)$, e $(x_5, y_5, z_5)$, and f $(x_6, y_6, z_6)$. The three points a, b, and c are substituted into the spatial plane equation $Ax+By+Cz+D=0$, and $A_1$, $B_2$, $C_2$, and $D_2$ are obtained through calculation. The coefficients $A_1$, $B_1$, $C_1$, and $D_1$ and the coefficients $A_2$, $B_2$, $C_2$, and $D_2$ that are solved for twice are compared. If an error of the coefficients A, B, C, and D of the plane equation that are solved for twice is less than the third threshold, the plane equation determined based on the coefficients A, B, C, and D whose error is less than the third threshold is the plane equation of the reference plane. If the error of the coefficients A, B, C, and D of the plane equation that are solved for twice is greater than or equal to the third threshold, three points j, h, and i in the area of the quadrilateral are selected again, and coordinates of the three points are specifically j $(x_4, y_4, z_4)$, h $(x_5, y_5, z_5)$, and i $(x_6, y_6, z_6)$. The three points j, h, and i are substituted into the spatial plane equation $Ax+By+Cz+D=0$, and $A_3$, $B_3$, $C_3$, and $D_3$ are obtained through calculation. The coefficients $A_1$, $B_1$, $C_1$, and $D_1$ and the coefficients $A_3$, $B_3$, $C_3$, and $D_3$ are compared, and the coefficients $A_2$, $B_2$, $C_2$, and $D_2$ and the coefficients $A_3$, $B_3$, $C_3$, and $D_3$ are compared, where the coefficients $A_1$, $B_1$, $C_1$, and $D_1$, the coefficients $A_2$, $B_2$, $C_2$, and $D_2$, and the coefficients $A_3$, $B_3$, $C_3$, and $D_3$ are solved for three times. If an error of the coefficients A, B, C, and D of the plane equation that are solved for twice of the three times is less than the third threshold, the plane equation determined based on the coefficients A, B, C, and D whose error is less than the third threshold is the plane equation of the reference plane. If a requirement for establishing the plane equation of the reference plane still cannot be satisfied, points continue to be selected to solve for the coefficients A, B, C, and D, until a requirement that the error of the coefficients A, B, C, and D is less than the third threshold is satisfied.

Optionally, the plurality of sampling points of the quadrilateral have corresponding projected points on the reference plane.

Optionally, depth data of the plurality of sampling points of the quadrilateral and depth data of the projected points corresponding to the plurality of sampling points may be partially the same, or may be totally the same, or may be totally different.

Optionally, the quadrilateral may be determined more accurately by performing the edge detection on the reference plane.

203. Calculate a difference between first depth data and second depth data, where the first depth data is a distance between each of the plurality of sampling points and a plane on which a camera is located, and the second depth data is a distance between the projected point corresponding to each sampling point and the plane on which the camera is located.

For example, calculating the difference between the first depth data and the second depth data may be calculating a difference between a distance between a sampling point 1 and the plane on which the camera is located and a distance between a projected point for the sampling point 1 and the plane on which the camera is located.

Optionally, a difference corresponding to each of the plurality of sampling points is calculated.

Optionally, differences corresponding to different sampling points may be the same or may be different.

204. Determine, based on the difference, whether an obstruction exists in the area of the quadrilateral.

Optionally; whether the obstruction exists in the area of the quadrilateral may be determined in the following manner:

If a percentage of sampling points whose difference is greater than a first threshold in a total quantity of the plurality of sampling points is greater than a second threshold, it is determined that the obstruction exists in the area of the quadrilateral; or if a percentage of sampling points whose difference is greater than a first threshold in a total quantity of the plurality of sampling points is less than or equal to a second threshold, or if the difference of each sampling point is less than or equal to the first threshold, it is determined that no obstruction exists in the area of the quadrilateral.

Optionally, when no obstruction exists in the area of the quadrilateral, document correction is performed on the quadrilateral.

Therefore, in this embodiment of this application whether an obstruction exists in an area of a photographed image is determined by using a difference between depth data of the photographed image and depth data of a reference plane.

Optionally; in an embodiment, as shown in FIG. 3, the method 200 further includes the following content.

205. When the obstruction exists in the area of the quadrilateral, obtain a first sampling point whose difference is greater than a first threshold in the area of the quadrilateral.

Optionally; when the obstruction exists in the area of the quadrilateral, the first depth data in the area of the quadrilateral is changed due to impact of the obstruction. Compared with the first depth data at a location at which no obstruction exists, the first depth data at a location at which the obstruction exists is significantly smaller.

Optionally when the obstruction exists, the difference between the first depth data and the second depth data is greater than the first threshold.

Optionally; the first sampling point whose difference is greater than the first threshold may be all sampling points in the area of the quadrilateral, or may be some sampling points in the area of the quadrilateral.

206. Determine a first obstruction area based on a location of the first sampling point.

Optionally, all first sampling points whose difference is greater than the first threshold are obtained, and the first obstruction area is determined based on locations of the sampling points.

For example, all the first sampling points whose difference is greater than the first threshold are sequentially connected by using line segments, and an area enclosed by the line segments is determined as the first obstruction area.

207. Restore obstructed information in the first obstruction area.

Optionally, a second image is photographed, where the second image includes partial or all obstructed information in the first obstruction area; and the obstructed information in the first obstruction area is restored based on the partial or all obstructed information.

Optionally, first prompt information is generated based on the first obstruction area. The first prompt information is used to prompt a location of the obstruction, and a user photographs the second image based on the first prompt information.

Optionally, second prompt information is generated based on the first obstruction area. The second prompt information is used to instruct the user to move the camera, and the user photographs the second image based on the second prompt information.

Optionally, the partial or all obstructed information in the first obstruction area may be stored based on the second image.

Optionally, a feature descriptor of the first image may be calculated based on a feature point of the first image; a feature descriptor of the second image is calculated based on a feature point of the second image; a transformation matrix between the first image and the second image is calculated based on the feature descriptor of the first image and the feature descriptor of the second image; and finally, an interpolation operation is performed on the first obstruction area based on a grayscale value of the second image and the transformation matrix, to restore the obstructed information in the first obstruction area.

It should be understood that the feature point may be a point that can be easily detected because the point is located in an area in which a grayscale changes greatly and is relatively easy to be distinguished from a surrounding pixel point, for example, a corner point (Corner) of a rectangular frame in an image. Generally, these points may be described by using a feature descriptor (Feature Descriptor) calculated by using a point in a surrounding area of the points. In addition, the feature descriptor may be scale-invariant feature transform (Scale-invariant Feature Transform, SIFT), speeded up robust features (Speeded Up Robust Features, SURF), a histogram of oriented gradient (Histogram of Oriented Gradient, HOG), or the like. The feature descriptor is usually a vector. Whether two feature points match can be determined by detecting feature points in different images and calculating similarity (such as a Euclidean distance) between descriptors of the feature points, so that the feature points are tracked in different frame images.

It should be further understood that calculating a transformation matrix between two images based on corresponding feature points may be as follows: An initial value may be first calculated by using a linear algorithm such as direct linear transformation (Direct Linear Transformation, DLT), and then optimization is further performed by using a non-linear algorithm such as a Gauss-Newton algorithm (Gauss-Newton algorithm), a gradient descent (Gradient Descent) algorithm, or a Levenberg-Marquardt (Levenberg-Marquardt, LM) algorithm.

Optionally, the information in the obstructed area in the second image may be restored by using the first image.

Optionally, after the obstructed information in the first obstruction area is restored, document correction is performed on the quadrilateral.

Optionally, when only the partial obstructed information in the first obstruction area is restored based on the second image, a third image is photographed, and the third image includes partial or all obstructed information that has not been restored in the first obstruction area.

Optionally, first prompt information is generated based on the first obstruction area. The first prompt information is used to prompt a location of an obstruction that has not been restored, and the user photographs the third image based on the first prompt information.

Optionally, second prompt information is generated based on the first obstruction area. The second prompt information is used to instruct the user to move the camera, and the user photographs the third image based on the second prompt information.

Optionally, the obstructed information in the first obstruction area is restored based on the partial obstructed information that is in the first obstruction area and that is included in the second image and the partial obstructed information that is in the first obstruction area and that is included in the third image.

Optionally, alternatively, a feature descriptor of the first image may be calculated based on a feature point of the first image; a feature descriptor of the third image is calculated based on a feature point of the third image; a transformation matrix between the first image and the third image is calculated based on the feature descriptor of the first image and the feature descriptor of the third image, and finally, an interpolation operation is performed on the first obstruction area based on a grayscale value of the third image and the transformation matrix, to restore the obstructed information in the first obstruction area.

Optionally, when the obstruction area in the first image cannot be totally restored in a combination of the second image and the third image, a fourth image, a fifth image, and the like are photographed, and the obstruction area in the first image is restored in a combination of a plurality of images.

Optionally, when the obstructed area in the first image cannot be restored after the plurality of images are photographed, some obstructed areas in the first image cannot be restored, and a message indicating a failure in restoring the obstructed areas is returned.

Figure 4A:
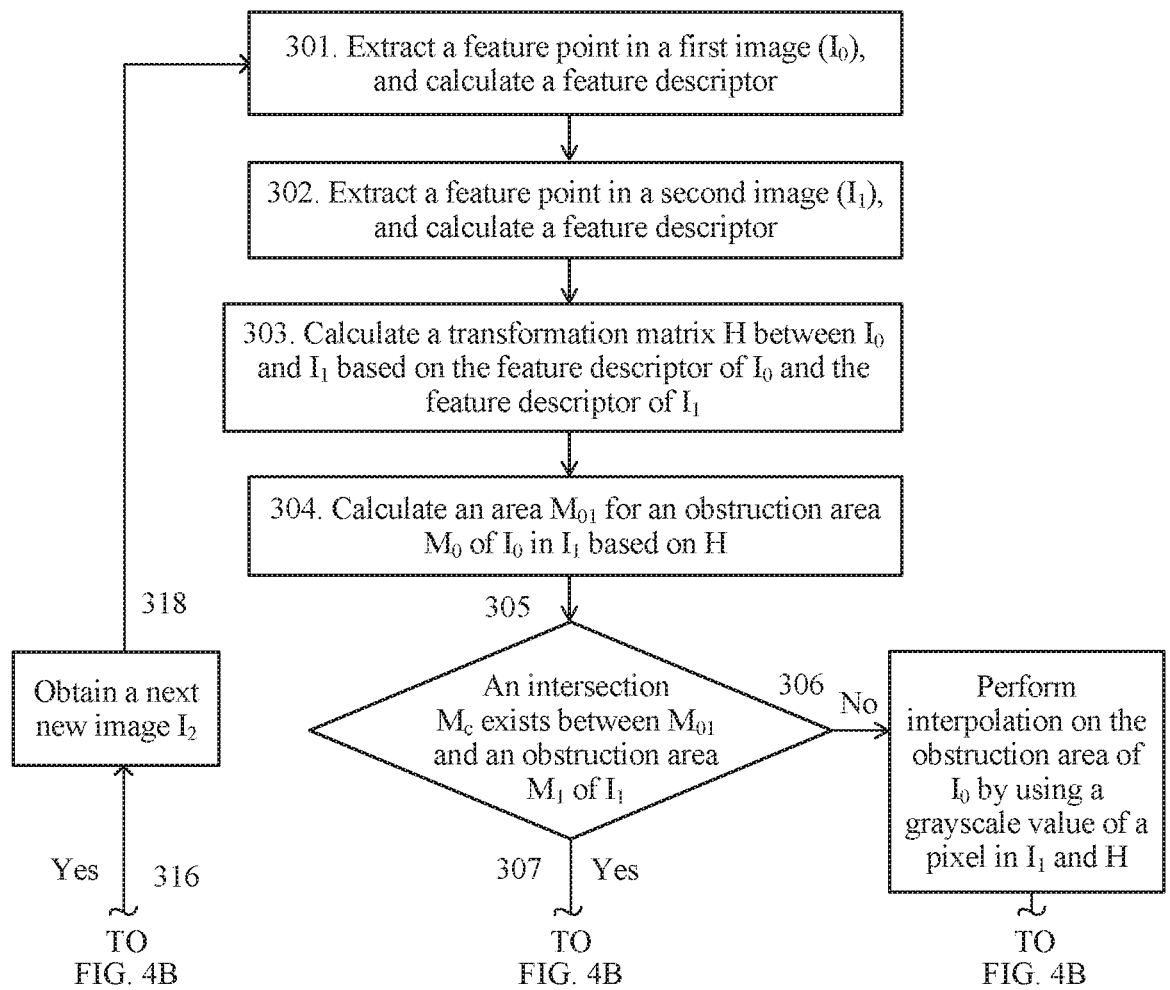
FIG. 4A and FIG. 4B are a schematic flowchart of restoring obstruction information in an area of a quadrilateral.
Figure 4B:
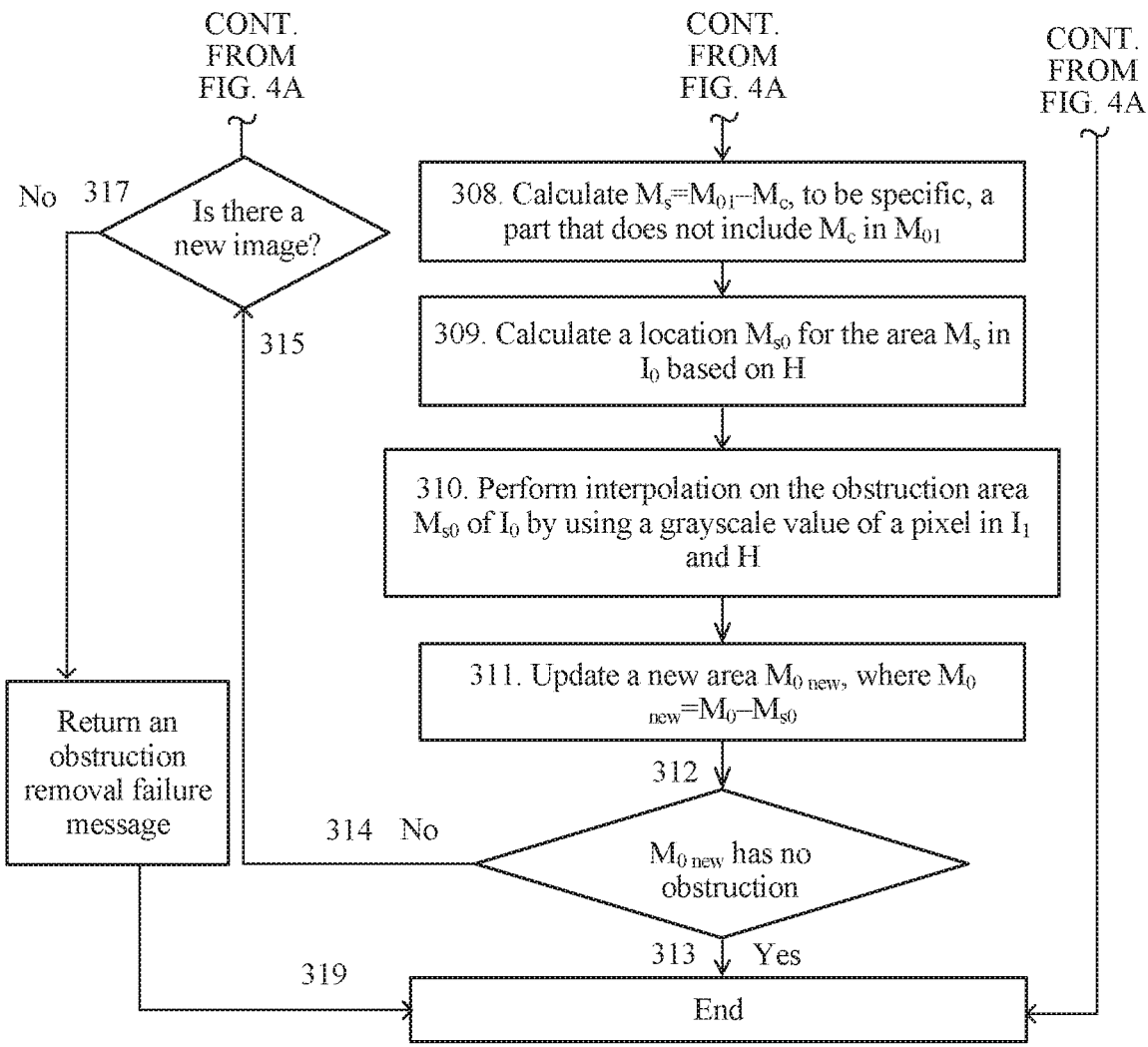

For example, FIG. 4A and FIG. 4B are a schematic diagram of restoring obstructed information in an area of a quadrilateral. As shown in FIG. 4A and FIG. 4B, when it is determined that an obstruction exists in the area of the quadrilateral, a specific operation procedure for restoring obstructed information in a first obstruction area in the area of the quadrilateral is as follows.

301. Extract a feature point from a first image $I_0$ that has an obstruction, and calculate a feature descriptor of the first image $I_0$.

302. Extract a feature point from a second image $I_1$, and calculate a feature descriptor of the second image $I_1$.

303. Calculate a transformation matrix H between the first image $I_0$ and the second image $I_1$ based on the feature descriptor of the first image $I_0$ and the feature descriptor of the second image $I_1$.

304. Calculate an obstruction area $M_{01}$ for an obstruction area $M_0$ of the first image $I_0$ in the second image $I_1$ based on the transformation matrix H.

305. Determine whether an intersection area $M_c$ exists between the obstruction area $M_{01}$ and an obstruction area $M_1$ of the second image $I_1$.

306. When the intersection area $M_c$ does not exist between the obstruction area $M_{01}$ and the obstruction area $M_1$ of the second image $I_1$, perform an interpolation operation on the obstruction area $M_0$ of the first image $I_0$ by using a grayscale value of a pixel in the second image $I_1$ and the transformation matrix H.

Figure 5:
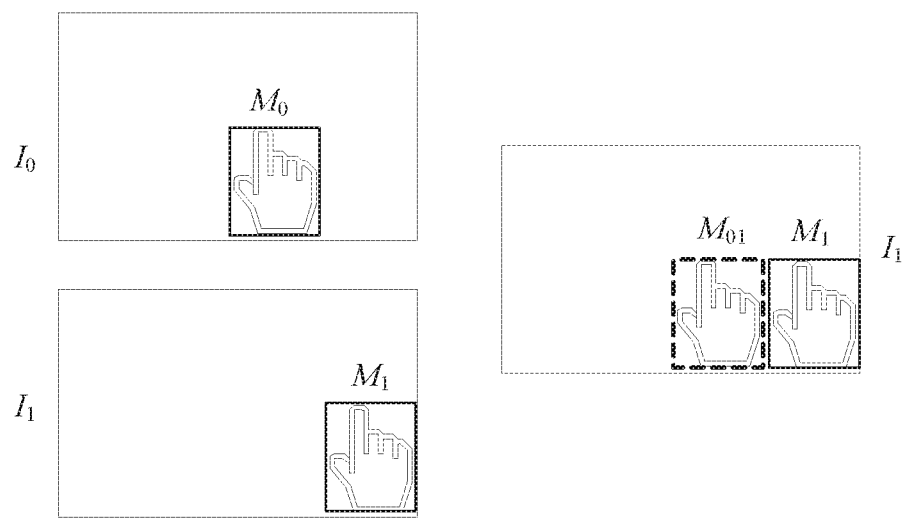
FIG. 5 is a schematic diagram of restoring obstructed information in an area of a quadrilateral.

For example, as shown in FIG. 5, the obstruction area of the first image $I_0$ is $M_0$, the obstruction area of the second image $I_1$ is $M_1$, and the obstruction area $M_{01}$ for the obstruction area $M_0$ in the second image $I_1$ is calculated based on the transformation matrix H. $M_{01}$ and $M_1$ have no intersection, and the obstruction area $M_0$ of the first image $I_0$ can be restored based on the second image $I_1$. A specific restoration manner is as follows: performing the interpolation operation on the obstruction area $M_0$ by using the grayscale value of the second image $I_1$ and the transformation matrix H between the first image $I_0$ and the second image $I_1$.

307. The intersection area $M_c$ exists between the obstruction area $M_{01}$ and the obstruction area $M_1$ of the second image $I_1$.

308. Calculate a non-intersection area $M_s$ in $M_{01}$, where $M_s = M_{01} - M_c$.

309. Calculate a location $M_{s0}$ for $M_s$ in the first image $I_0$ based on the transformation matrix H.

310. Perform an interpolation operation on the obstruction area $M_{s0}$ by using a grayscale value of the second image $I_1$ and the transformation matrix H between the first image $I_0$ and the second image $I_1$.

311. Update a new obstruction area $M_{0\ new}$ of the first image $I_0$, where $M_{0\ new} = M_0 - M_{s0}$.

Figure 6:
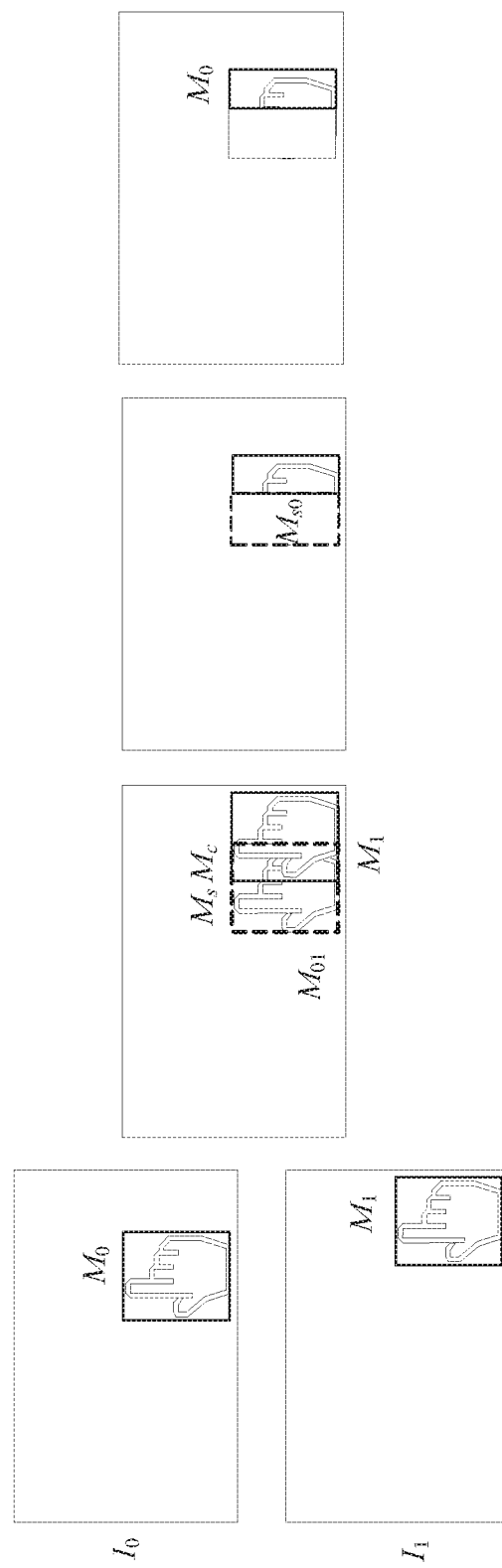
FIG. 6 is another schematic diagram of restoring obstructed information in an area of a quadrilateral.

For example, as shown in FIG. 6, the obstruction area of the first image $I_0$ is $M_0$, the obstruction area of the second image $I_1$ is $M_1$, and the obstruction area $M_{01}$ for the obstruction area $M_0$ in the second image $I_1$ is calculated based on the transformation matrix H. $M_{01}$ and $M_1$ have the intersection $M_c$. The non-intersection area $M_s$ in $M_{01}$ is calculated, where $M_s = M_{01} - M_c$. The location $M_{s0}$ for $M_s$ in the first image $I_0$ is calculated based on the transformation matrix H. In this case, the obstruction area $M_{s0}$ of the first image $I_0$ can be restored based on the second image $I_1$. A specific restoration manner is as follows: performing the interpolation operation on the obstruction area $M_{s0}$ by using the grayscale value of the second image $I_1$ and the transformation matrix H between the first image $I_0$ and the second image $I_1$.

312. Determine whether the new obstruction area $M_{0\ new}$ has no obstruction.

313. When the new obstruction area $M_{0\ new}$ has no obstruction, obstructed information in the obstruction area $M_0$ of the first image $I_0$ is restored, and the procedure of restoring the obstructed information ends.

314. The new obstruction area $M_{0\ new}$ has an obstruction.

315. Determine whether a new image exists.

316. If the new image exists, obtain a next new image $I_2$, to be specific, photograph a third image.

317. If no new image exists, return an obstruction removal failure message.

318. After the third image is photographed, perform the operation 301 again.

319. After the obstruction removal failure message is returned, the procedure of restoring the obstructed information ends.

Therefore, in this embodiment of this application, when it is determined that an obstruction exists in an area of a photographed image, an obstruction area is determined by using depth data of the photographed image and depth data of a reference plane, and obstructed information is restored.

Figure 7:
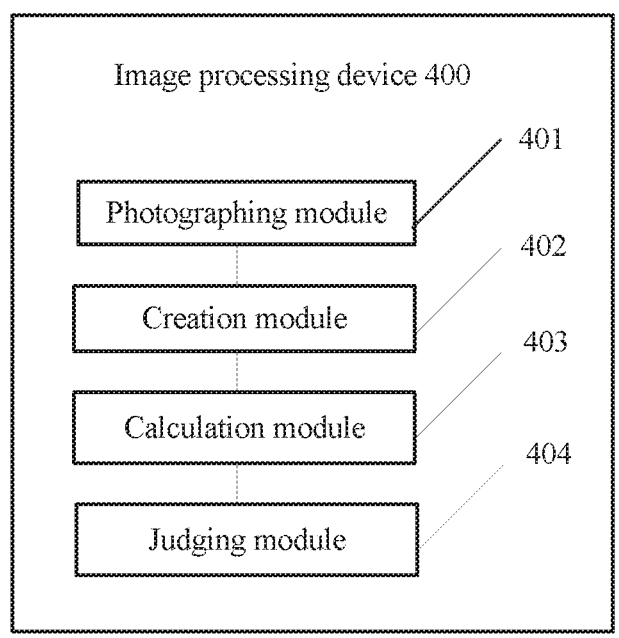
FIG. 7 is a schematic block diagram of an image processing device according to an embodiment of this application.

FIG. 7 is a schematic block diagram of an image processing device 400 according to an embodiment of this application. As shown in FIG. 7, the device includes:

a photographing module 401, configured to photograph a first image, where the first image includes a quadrilateral, and there are a plurality of sampling points in an area of the quadrilateral;

a creation module 402, configured to establish a reference plane, where the reference plane is a plane on which the quadrilateral is located, and the plurality of sampling points have corresponding projected points on the reference plane;

a calculation module 403, configured to calculate a difference between first depth data and second depth data, where the first depth data is a distance between each of the plurality of sampling points and a plane on which a camera is located, and the second depth data is a distance between the projected point corresponding to each sampling point and the plane on which the camera is located; and a judging module 404, configured to determine, based on the difference, whether an obstruction exists in the area of the quadrilateral.

Figure 8:
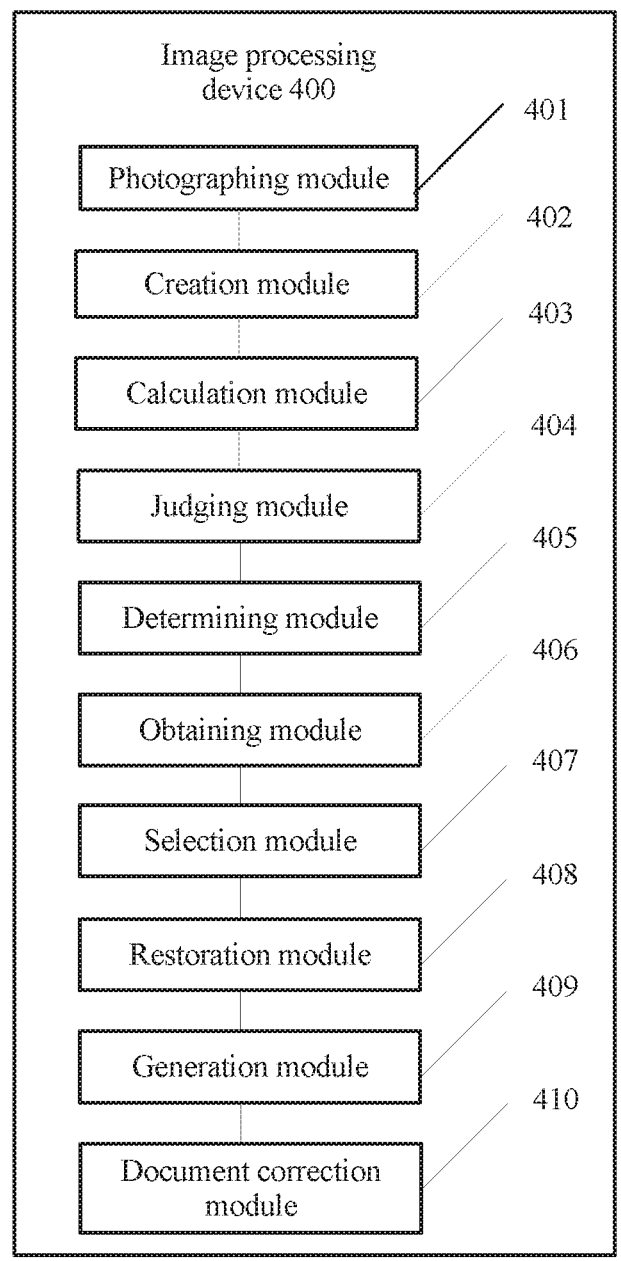
FIG. 8 is a schematic block diagram of an image processing device according to another embodiment of this application.

Optionally, in this embodiment of this application, as shown in FIG. 8, before the creation module 402 establishes the reference plane, the device 400 further includes:

a determining module 405, configured to perform edge detection on the first image to determine at least four edge line segments;

an obtaining module 406, configured to obtain depth data of each edge line segment of the at least four edge line segments; and a selection module 407, configured to select, based on the depth data of each edge line segment, four edge line segments on a same plane to form the quadrilateral.

Optionally, in this embodiment of this application, modules included in FIG. 8 may not exist.

Optionally, based on the difference, the judging module 404 is specifically configured to:

if a percentage of sampling points whose difference is greater than a first threshold in a total quantity of the plurality of sampling points is greater than a second threshold, determine that the obstruction exists in the area of the quadrilateral; or if a percentage of sampling points whose difference is greater than a first threshold in a total quantity of the plurality of sampling points is less than or equal to a second threshold, or if the difference of each sampling point is less than or equal to the first threshold, determine that no obstruction exists in the area of the quadrilateral.

Optionally, in this embodiment of this application, as shown in FIG. 8, the terminal 400 further includes a restoration module 408, where when the judging module 404 determines that the obstruction exists in the area of the quadrilateral, the obtaining module 406 is further configured to obtain a first sampling point whose difference is greater than the first threshold in the area of the quadrilateral;

the determining module 405 is further configured to determine a first obstruction area based on a location of the first sampling point; and the restoration module 408 is configured to restore obstructed information in the first obstruction area.

Optionally, in this embodiment of this application, modules included in FIG. 8 may not exist.

Optionally, the restoration module 408 is specifically configured to:

the photographing module 401 is further configured to photograph a second image, where the second image includes partial or all obstructed information in the first obstruction area; and the restoration module 408 restores the obstructed information in the first obstruction area based on the partial or all obstructed information.

Optionally; the restoration module 408 is specifically configured to:

the photographing module 401 is further configured to photograph a third image, where the third image includes partial obstructed information in the first obstruction area; and the restoration module 408 restores the obstructed information in the first obstruction area based on the partial obstructed information that is in the first obstruction area and that is included in the second image and the partial obstructed information that is in the first obstruction area and that is included in the third image.

Optionally, in this embodiment of this application, as shown in FIG. 8, the terminal 400 further includes:

a generation module 409, configured to generate first prompt information, where the first prompt information is used to prompt a location of the obstruction.

Optionally, in this embodiment of this application, modules included in FIG. 8 may not exist.

Optionally; the generation module 409 is further configured to:

generate second prompt information, where the second prompt information is used to instruct a user to move the camera.

Optionally, in this embodiment of this application, as shown in FIG. 8, the terminal 400 further includes a document correction module 410, configured to perform document correction on the quadrilateral after the restoration module 408 restores the obstructed information in the first obstruction area.

Optionally, the document correction module 410 is further configured to: when the judging module 404 determines that the obstruction exists in the area of the quadrilateral, perform document correction on the quadrilateral.

Optionally, the first image is an image including document information.

It should be understood that the foregoing and other operations and/or functions of the modules of the image processing device 400 in this embodiment of this application are separately used to implement corresponding procedures of the method 200 in the embodiments of this application. For brevity, details are not described herein.

Figure 9:
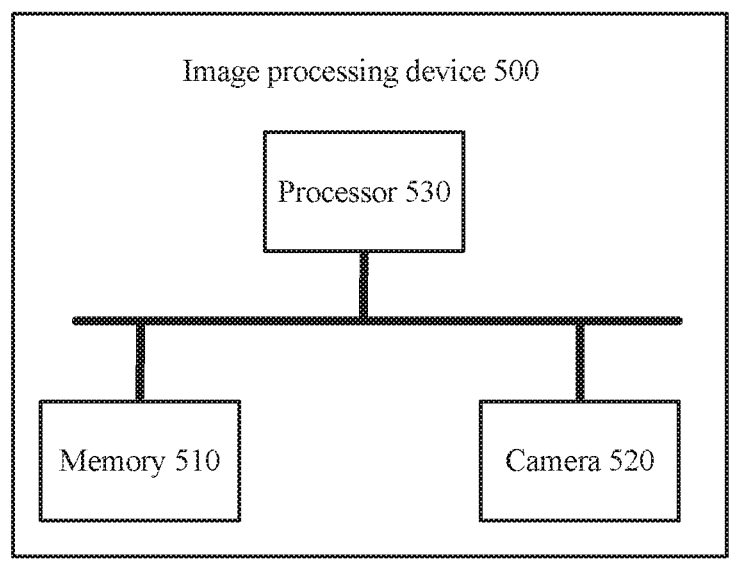
FIG. 9 is a schematic block diagram of an image processing device according to an embodiment of this application.

FIG. 9 is a schematic block diagram of an image processing device 500 according to an embodiment of this application. The device 500 includes:

a memory 510, configured to store program code:

a camera 520, configured to photograph an image; and a processor 530, configured to execute the program code stored in the memory 510.

Optionally, the program code includes execution code of each operation of the method 200 in this embodiment of this application.

It should be understood that, in this embodiment of this application, the processor 530 may be a central processing unit (Central Processing Unit. "CPU" for short), or the processor 530 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 510 may include a read-only memory and a random access memory, and provides an instruction and data for the processor 530. A part of the memory 510 may further include a non-volatile random access memory. For example, the memory 510 may further store information about a device type.

Optionally, the camera 520 is configured to photograph a first image, where the first image includes a quadrilateral, and there are a plurality of sampling points in an area of the quadrilateral;

the processor 530 is configured to establish a reference plane, where the reference plane is a plane on which the quadrilateral is located, and the plurality of sampling points have corresponding projected points on the reference plane;

the processor 530 is configured to calculate a difference between first depth data and second depth data, where the first depth data is a distance between each of the plurality of sampling points and a plane on which the camera is located, and the second depth data is a distance between the projected point corresponding to each sampling point and the plane on which the camera is located; and the processor 530 is configured to determine, based on the difference, whether an obstruction exists in the area of the quadrilateral.

Optionally, before establishing the reference plane, the processor 530 is further configured to:

perform edge detection on the first image to determine at least four edge line segments;

obtain depth data of each edge line segment of the at least four edge line segments; and select, based on the depth data of each edge line segment, four edge line segments on a same plane to form the quadrilateral.

Optionally, the processor 530 is further configured to:

if a percentage of sampling points whose difference is greater than a first threshold in a total quantity of the plurality of sampling points is greater than a second threshold, determine that the obstruction exists in the area of the quadrilateral; or if a percentage of sampling points whose difference is greater than a first threshold in a total quantity of the plurality of sampling points is less than or equal to a second threshold, or if the difference of each sampling point is less than or equal to the first threshold, determine that no obstruction exists in the area of the quadrilateral.

Optionally, the processor 530 is further configured to:

when determining that the obstruction exists in the area of the quadrilateral, obtain a first sampling point whose difference is greater than the first threshold in the area of the quadrilateral;

determine a first obstruction area based on a location of the first sampling point; and restore obstructed information in the first obstruction area.

Optionally; the camera 520 is further configured to photograph a second image, where the second image includes partial or all obstructed information in the first obstruction area; and the processor 530 is further configured to restore the obstructed information in the first obstruction area based on the partial or all obstructed information.

Optionally, the camera 520 is further configured to photograph a third image, where the third image includes partial obstructed information in the first obstruction area; and the processor 530 is further configured to restore the obstructed information in the first obstruction area based on the partial obstructed information that is in the first obstruction area and that is included in the second image and the partial obstructed information that is in the first obstruction area and that is included in the third image.

Optionally; the processor 530 is further configured to:

generate first prompt information, where the first prompt information is used to prompt a location of the obstruction.

Optionally, the processor 530 is further configured to:

generate second prompt information, where the second prompt information is used to instruct a user to move the camera.

Optionally, the processor 530 is further configured to: after restoring the obstructed information in the first obstruction area, perform document correction on the quadrilateral.

Optionally; the processor 530 is further configured to: when no obstruction exists in the area of the quadrilateral, perform document correction on the quadrilateral.

Optionally, the first image is an image including document information.

In an implementation process, the foregoing steps may be completed by using an integrated logic circuit of hardware in the processor 530 or an instruction in a form of software. Steps of the method 200 disclosed with reference to the embodiments of this application may be directly performed and completed by a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 530 reads information in the memory, and completes the steps in the method 200 in combination with hardware of the processor. To avoid repetition, details are not described herein.

Figure 10:
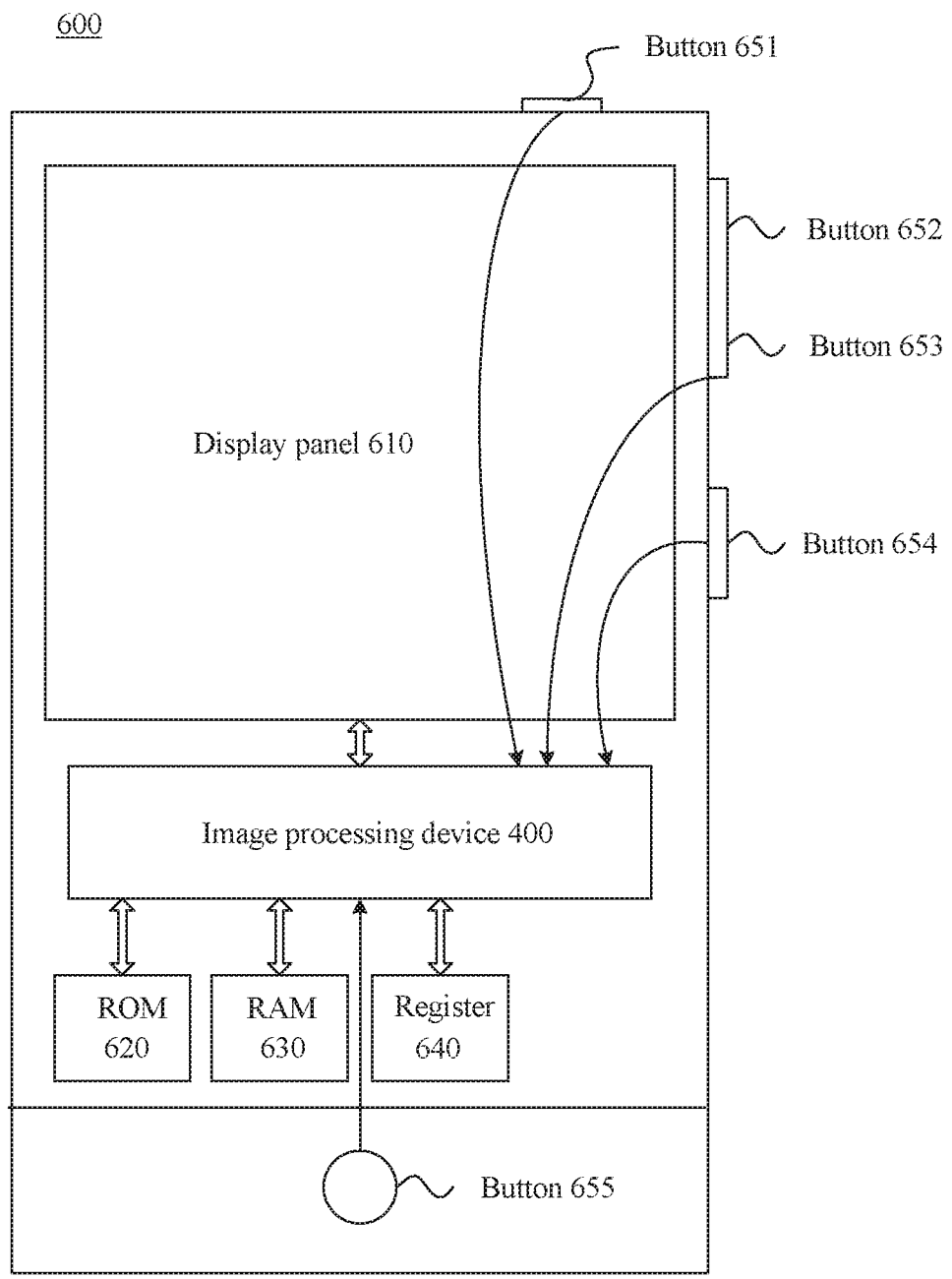
FIG. 10 is a schematic structural diagram of a terminal device according to an embodiment of this application.

FIG. 10 is a schematic structural diagram of a terminal device 600 according to an embodiment of this application. As shown in FIG. 10, the terminal device 600 includes an image processing device 400, a display panel 610, a read-only memory (Read Only Memory, ROM) 620, a random access memory (Random Access Memory, RAM) 630, a register 640, and a button 651 to a button 655 according to an embodiment of this application.

The image processing device 400 may perceive a key event of the button 651 to the button 655, for example, a photographing event, an image processing event, or a document correction event, and may perform a corresponding image processing function.

The ROM 620 may be configured to store code that needs to be executed by the image processing device 400. The RAM 630 is configured for the image processing device 400 to execute the code stored in the ROM 620, to implement a corresponding function. The register 640 is configured to store a type for the terminal device 600 to enable the image processing device 400.

The display panel 610 is configured to display a running status of the terminal device 600 and a status of performing image processing by the image processing device 400, to provide a friendly interaction interface for a user, and provide guidance for the user to perform related operations.

Optionally, the display panel 610 may be covered with a touchscreen. The touchscreen may be used to perceive a touch event of the user, and control the image processing device 400 to perform a corresponding operation, to provide some options for the user.

It should be understood that, in this embodiment of this application, the structure of the terminal device 600 shown in FIG. 10 does not constitute a limitation to the terminal device. The terminal device 600 may further include more or fewer parts than those shown in the diagram, or may combine some parts, or may have different part arrangements.

An embodiment of this application provides a computer readable storage medium, configured to store an instruction. When the instruction is run on a computer, the computer may be configured to perform the image processing method 200 in the foregoing embodiment of this application. The readable medium may be a ROM or a RAM, and this is not limited in this embodiment of this application.

The terms "and/or" and "at least one of A or B" in this specification describe only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
    a camera;
    a processor coupled to the camera; and
    a memory coupled to the processor and comprising instructions that, when executed by the processor, cause the electronic device to be configured to:
        photograph a document that includes first information in a first area to obtain a first image that comprises the document and a first object, wherein the first object obscures the first information in the first image;
        determine a location of the first area in the first image based on depth data collected by the camera;
        photograph the document to obtain a second image that includes the first information;
        restore the first information in the location of the first area in the first image based on interpolation using the grayscale value of the second image to obtain a third image; and
        display the third image, wherein the document is displayed in the third image with the first object being removed from the location of the first area of the document.

2. The electronic device of claim 1, wherein the instructions further cause the electronic device to be configured to:
    establish a reference plane, wherein the reference plane is a plane on which the document is located, wherein there are a plurality of sampling points in an area of the document, and wherein the plurality of sampling points have corresponding projected points on the reference plane;
    calculate a difference between first depth data and second depth data, wherein the first depth data is a distance between each of the plurality of sampling points and a plane on which the camera is located, and wherein the second depth data is a distance between a projected point corresponding to each of the plurality of sampling points and the plane on which the camera is located; and
    determine the location of the first area in the first image based on the difference between the first depth data and the second depth data.

3. The electronic device of claim 2, wherein the instructions further cause the electronic device to be configured to determine that the first object exists in the first area of the document when a percentage of sampling points whose difference is greater than a first threshold in the plurality of sampling points is greater than a second threshold.

4. The electronic device of claim 2, wherein the instructions further cause the electronic device to be configured to:
    perform edge detection on the first image to determine at least four edge line segments;
    obtain depth data of each edge line segment of the at least four edge line segments; and
    select, based on the depth data, four edge line segments on a same plane to establish the reference plane.

5. The electronic device of claim 1, wherein the instructions further cause the electronic device to be configured to generate a first prompt information, and wherein the first prompt information is used to prompt the location of the first area.

6. The electronic device of claim 1, wherein the instructions further cause the electronic device to be configured to generate a second prompt information that is used to instruct a user to move the camera and to photograph the document to obtain the second image.

7. The electronic device of claim 1, wherein the instructions further cause the electronic device to perform document correction after restoring the first information in the location of the first area.

8. A non-transitory computer readable medium storing computer instructions that, when executed by a processor, cause an electronic device to be configured to:
    photograph a document that includes first information in a first area to obtain a first image that comprises the document and a first object, wherein the first object obscures the first information in the first image;
    determine a location of the first area in the first image based on depth data collected by the electronic device;
    photograph the document to obtain a second image that includes the first information;
    restore the first information in the location of the first area in the first image based on interpolation using the grayscale value of the second image to obtain a third image; and
    display the third image, wherein the document is displayed in the third image with the first object being removed from the location of the first area of the document.

9. The non-transitory computer readable medium of claim 8, wherein the computer instructions further cause the electronic device to be configured to:
    establish a reference plane, wherein the reference plane is a plane on which the document is located, wherein there are a plurality of sampling points in an area of the document, and wherein the plurality of sampling points have corresponding projected points on the reference plane;
    calculate a difference between first depth data and second depth data, wherein the first depth data is a distance between each of the plurality of sampling points and a plane on which a camera is located, and the second depth data is a distance between a projected point corresponding to each of the plurality of sampling points and the plane on which the camera is located; and
    determine the location of the first area in the first image based on the difference between the first depth data and the second depth data.

10. The non-transitory computer readable medium of claim 9, wherein the computer instructions further cause the electronic device to be configured to determine—that the first object exists in the first area of the document when a percentage of the plurality of sampling points whose difference is greater than a first threshold is greater than a second threshold.

11. The non-transitory computer readable medium of claim 9, wherein the computer instructions further cause the electronic device to be configured to:
perform edge detection on the first image to determine at least four edge line segments;
obtain depth data of each edge line segment of the at least four edge line segments; and
select, based on the depth data, four edge line segments on a same plane to establish the reference plane.

12. The non-transitory computer readable medium of claim 8, wherein the computer instructions further cause the electronic device to be configured to generate a first prompt information configured to prompt the location of the first area.

13. The non-transitory computer readable medium of claim 8, wherein the computer instructions further cause the electronic device to be configured to generate a second prompt information, and wherein the second prompt information is used to instruct a user to move a camera and to photograph the document to obtain the second image.

14. The non-transitory computer readable medium of claim 8, wherein the computer instructions further cause the electronic device to be configured to perform document correction after restoring the first information in the location of the first area.

15. An image processing method, comprising:
photographing, by a camera of an electronic device, a document that includes first information in a first area to obtain a first image that comprises the document and a first object, wherein the first object obscures the first information in the first image;
determining a location of the first area in the first image based on depth data collected by the camera of the electronic device;
photographing the document to obtain a second image that includes the first information;
restoring the first information in the location of the first area in the first image based on interpolation using the grayscale value of the second image to obtain a third image; and
displaying the third image, wherein the document is displayed in the third image with the first object being removed from the location of the first area of the document.

16. The method of claim 15, wherein the determining the location of the first area in the first image comprises:
establishing a reference plane, wherein the reference plane is a plane on which the document is located, and wherein a plurality of sampling points have corresponding projected points on the reference plane;
calculating a difference between first depth data and second depth data, wherein the first depth data is a distance between each of the plurality of sampling points and a plane on which the camera is located, and wherein the second depth data is a distance between a projected point corresponding to each of the plurality of sampling points and the plane on which the camera is located; and
determining the location of the first area based on the difference between the first depth data and the second depth data.

17. The method of claim 16, wherein the method further comprises determining that the first object exists in the first area of the document when a percentage of the plurality of sampling points whose difference is greater than a first threshold is greater than a second threshold.

18. The method of claim 16, wherein the method further comprises:
performing edge detection on the first image to determine at least four edge line segments;
obtaining depth data of each edge line segment of the at least four edge line segments; and
selecting, based on the depth data, four edge line segments on a same plane to establish the reference plane.

19. The method of claim 15, wherein the method further comprises generating first prompt information used to prompt the location of the first area.

20. The method of claim 15, wherein the method further comprises generating second prompt information used to instruct a user to move the camera and to photograph the document to obtain the second image.

* * * * *

UNITED STATES PATENT AND TRADEMARK OFFICE
CERTIFICATE OF CORRECTION

PATENT NO. : 11,074,679 B2
APPLICATION NO. : 16/483950
DATED : July 27, 2021
INVENTOR(S) : Yahui Wang, Xin Chen and Yunchao Zhang Page 1 of 1

It is certified that error appears in the above-identified patent and that said Letters Patent is hereby corrected as shown below:

In the Claims

Claim 10, Column 21, Line 3: "to determine---that" should read "to determine that"

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*